United States Patent
Uhling et al.

(10) Patent No.: US 10,757,648 B2
(45) Date of Patent: Aug. 25, 2020

(54) COORDINATING COMMUNICATIONS BETWEEN NODES HAVING ASYNCHRONOUS TIME SLOT SCHEDULES

(71) Applicant: ITRON, INC., Liberty Lake, WA (US)

(72) Inventors: Thomas Uhling, Spokane Valley, WA (US); Imad Jamil, Meudon (FR); Fabrice Monier, Bry sur Marne (FR); Keith Wayne Barnes, Waseca, MN (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 16/024,574

(22) Filed: Jun. 29, 2018

(65) Prior Publication Data

US 2020/0008146 A1    Jan. 2, 2020

(51) Int. Cl.
*H04W 52/02* (2009.01)
*H04W 72/12* (2009.01)
*H04W 56/00* (2009.01)
*H04W 84/18* (2009.01)

(52) U.S. Cl.
CPC ... *H04W 52/0216* (2013.01); *H04W 72/1205* (2013.01); *H04W 72/1284* (2013.01); *H04W 72/1289* (2013.01); *H04W 56/001* (2013.01); *H04W 84/18* (2013.01)

(58) Field of Classification Search
CPC .................................................. H04W 52/0216
See application file for complete search history.

(56) References Cited

U.S. PATENT DOCUMENTS

| | | | |
|---|---|---|---|
| 9,642,133 B2* | 5/2017 | Shibuta | H04W 84/20 |
| 2004/0012521 A1* | 1/2004 | Akopian | G01S 19/24 |
| | | | 342/357.4 |
| 2008/0212613 A1* | 9/2008 | Perkinson | H04L 47/10 |
| | | | 370/475 |
| 2010/0157914 A1 | 6/2010 | Kim et al. | |
| 2013/0182699 A1* | 7/2013 | Yamamoto | H04W 56/002 |
| | | | 370/350 |

(Continued)

FOREIGN PATENT DOCUMENTS

| | | |
|---|---|---|
| CN | 107135509 A | 9/2017 |
| WO | 2008/000178 A1 | 1/2008 |

OTHER PUBLICATIONS

International Search Report for application No. PCT/US19/36618 dated Aug. 30, 2019.

*Primary Examiner* — Kevin M Cunningham
(74) *Attorney, Agent, or Firm* — Artegis Law Group, LLP

(57) ABSTRACT

A wireless mesh network includes a child node coupled to a parent node. The parent node transmits time sync beacons that indicate a time slot number and a start time for a current time slot. The child node receives the time sync beacons and determines a delta between the current time slot number of the child node and the current time slot number of the parent node. The child node also computes an offset between a start time of the current slot of the child node and the start time of the current slot of the parent node. The child node reports the delta and the offset to the parent node. Based on the delta and the offset, the parent node determines when, and on what channel, the child node is predicted to be receiving transmissions, and then schedules transmissions to the child node accordingly.

20 Claims, 7 Drawing Sheets

(56) References Cited

U.S. PATENT DOCUMENTS

| | | | | |
|---|---|---|---|---|
| 2013/0288672 A1* | 10/2013 | He | ............... | H04W 72/0406 455/434 |
| 2014/0348278 A1* | 11/2014 | Wong | ............... | H04J 3/0638 375/355 |
| 2014/0362717 A1* | 12/2014 | Koskinen | .......... | H04W 24/02 370/252 |

* cited by examiner

COORDINATING COMMUNICATIONS BETWEEN NODES HAVING ASYNCHRONOUS TIME SLOT SCHEDULES

BACKGROUND

Field of the Various Embodiments

Embodiments of the present invention relate generally to wireless network communications and, more specifically, to coordinating communications between nodes having asynchronous time slot schedules.

Description of the Related Art

A conventional wireless mesh network includes a plurality of nodes configured to communicate with one another. In certain types of heterogeneous wireless mesh networks, different types of nodes communicate and interact with one another within the network, including mains powered device (MPD) nodes and battery-powered device (BPD) nodes. MPD nodes typically are coupled to a power grid and have continuous access to power (except during power outages), which allows MPD nodes to receive and transmit data more or less continuously. On the other hand, BPD nodes are powered by batteries and therefore have only a finite supply of power. To manage the finite supply of power, BPD nodes normally remain in a powered-down state and power on only at intermittent intervals.

During operation, both MPD nodes and BPD nodes communicate using a technique known as "channel hopping." With channel hopping, a given node periodically transitions between different channels. The particular sequence of channels across which a given node transitions is referred to as a "channel hopping sequence." A given node normally receives transmissions only on the current channel in a particular channel hopping sequence; therefore, other nodes typically transmit data to the given node based on the particular channel hopping sequence. In addition, the given node usually receives transmissions only during a short "listen event" that occurs when the node is tuned to a particular channel in the channel hopping sequence. Such listen events recur periodically across different time slots within which the given node is able to communicate. Other nodes within the wireless mesh network attempt to transmit data to the given node during listen events, when the given node is able to receive data.

During initialization, MPD nodes and BPD nodes perform a discovery process to determine the channel hopping sequences of other nodes within the wireless mesh network. This information allows the various nodes within the mesh network to establish communication links or "pair" with one another. A given node can pair with one or more other nodes to provide those other nodes with network access. In such a configuration, the given node is considered to be the "parent" node, and the one or more other nodes are considered to be the "child" nodes of that parent node. This parent-child configuration provides child nodes residing at the fringes of the wireless mesh network with network access that otherwise would not be unavailable to those nodes. However, in conventional wireless mesh networks, the nodes in such parent-child configurations can experience communication problems.

More specifically, child nodes typically synchronize their time slots with those of a parent node during pairing, which can sometimes synchronize listen events with the parent node, as well. For example, if the child nodes and the parent node all execute listen events just after the start time of their respective time slots, then synchronizing time slots causes all of those listen events to occur at the same time. Because the child nodes can receive transmissions only during listen events, when those listen events occur in synchrony with the parent node, the child nodes lose the ability to communicate directly with the parent node. When communication is lost, the child nodes may need to repeat the discovery process to pair with a different parent node, which wastes limited battery power.

As the foregoing illustrates, what is needed in the art are more effectives techniques for coordinating communications between paired nodes in a wireless mesh network.

SUMMARY

Some embodiments include a computer-implemented method for establishing a communication link between nodes, including receiving a first beacon at a child node, wherein the first beacon is transmitted by a parent node and indicates a first time slot number assigned to a first time slot associated with the parent node and a first start time corresponding to the first time slot, computing a first delta based on the first time slot number and a second time slot number assigned to a second time slot associated with the child node, computing a first offset based on the first start time and a second start time corresponding to the second time slot, transmitting the first delta and the first offset to the parent node, wherein the parent node schedules subsequent transmissions to the child node based on the first delta and the first offset.

At least one advantage of these techniques is that the child node can remain paired with the parent node without synchronizing time slot schedules in a manner that would disrupt communications. In addition, the parent node need only transmit regular time beacons to the child nodes to allow the child nodes to maintain predictable timing relative to the parent node. Accordingly, these techniques represent a technological advantage over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted, the above-described discovery process oftentimes results in configurations of nodes where a parent node provides network access to one or more child nodes. With conventional nodes, the one or more child nodes synchronize time slots with the parent node, thereby causing those child nodes and the parent nodes to both receive communications during synchronized listen events. This synchronization impedes the ability of child nodes and parent nodes to communicate with one another because neither child node nor parent node can transmit during times when the other node listens.

To address these issues, various embodiments include a wireless mesh network that includes a child node coupled to a parent node. The parent node transmits time sync beacons that indicate a time slot number and a start time for a current time slot. The child node receives the time sync beacons and determines a delta between the current time slot number of the child node and the current time slot number of the parent node. The child node also computes an offset between a start time of the current slot of the child node and the start time of the current slot of the parent node. The child node reports the delta and the offset to the parent node. Based on the delta and the offset, the parent node determines when, and on what channel, the child node is predicted to be receiving transmissions, and then schedules transmissions to the child node accordingly. The child node also occasionally updates a real-time clock (RTC) based on the time sync beacons in order to maintain the same delta and offset reported to the parent node.

At least one advantage of these techniques is that the child node can remain paired with the parent node without synchronizing time slot schedules in a manner that would disrupt communications. In addition, the parent node need only transmit regular time sync beacons to the child nodes to allow the child nodes to maintain predictable timing relative to the parent node. Accordingly, these techniques represent a technological advantage over the prior art.

System Overview

Figure 1:
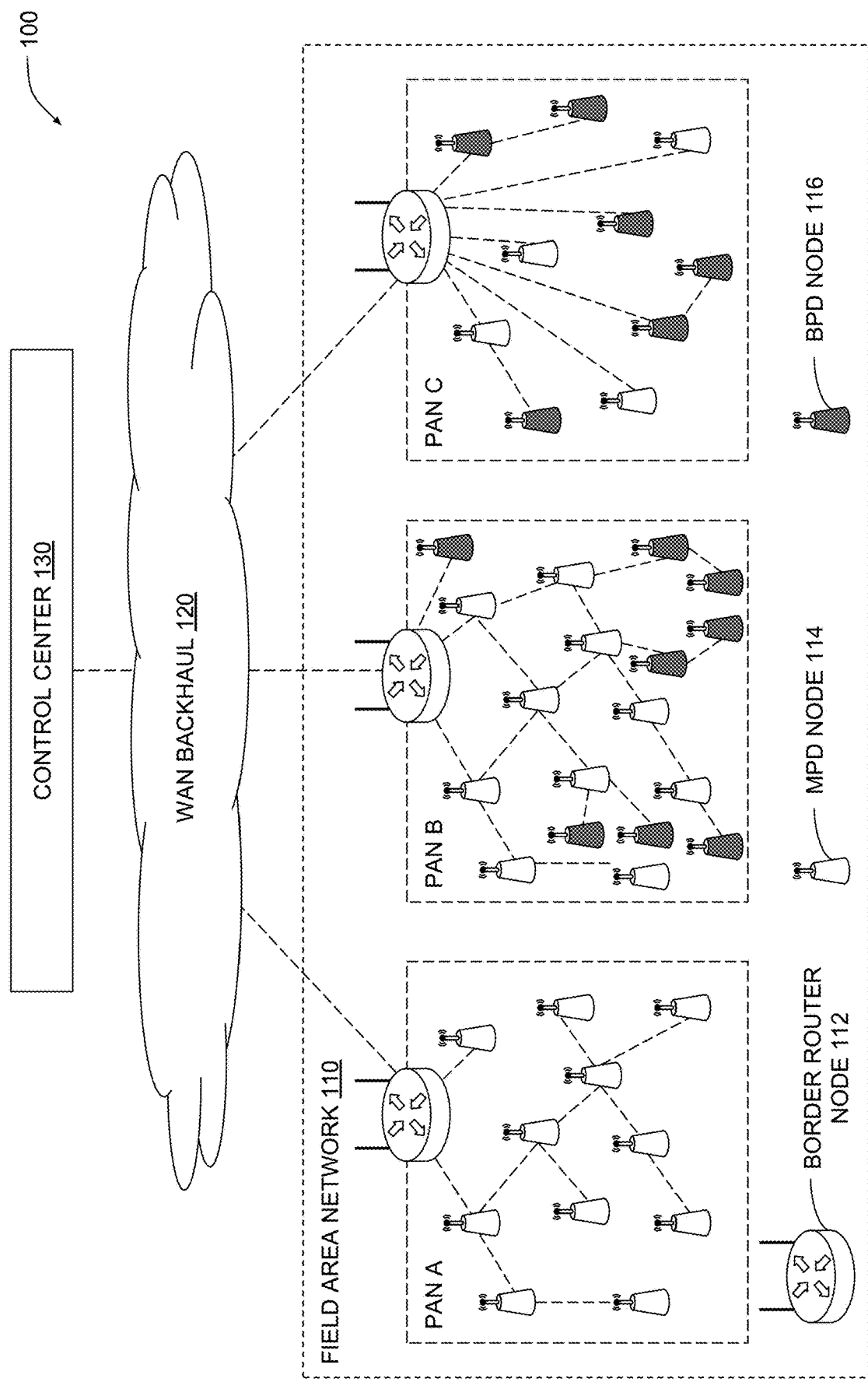
FIG. 1 illustrates a network system configured to implement one or more aspects of the present embodiments.

FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Any of border router nodes 112, MPD nodes 114, and BPD nodes 116 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node. Time slots and time slot numbers are discussed in greater detail below in conjunction with FIG. 3A.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 120 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
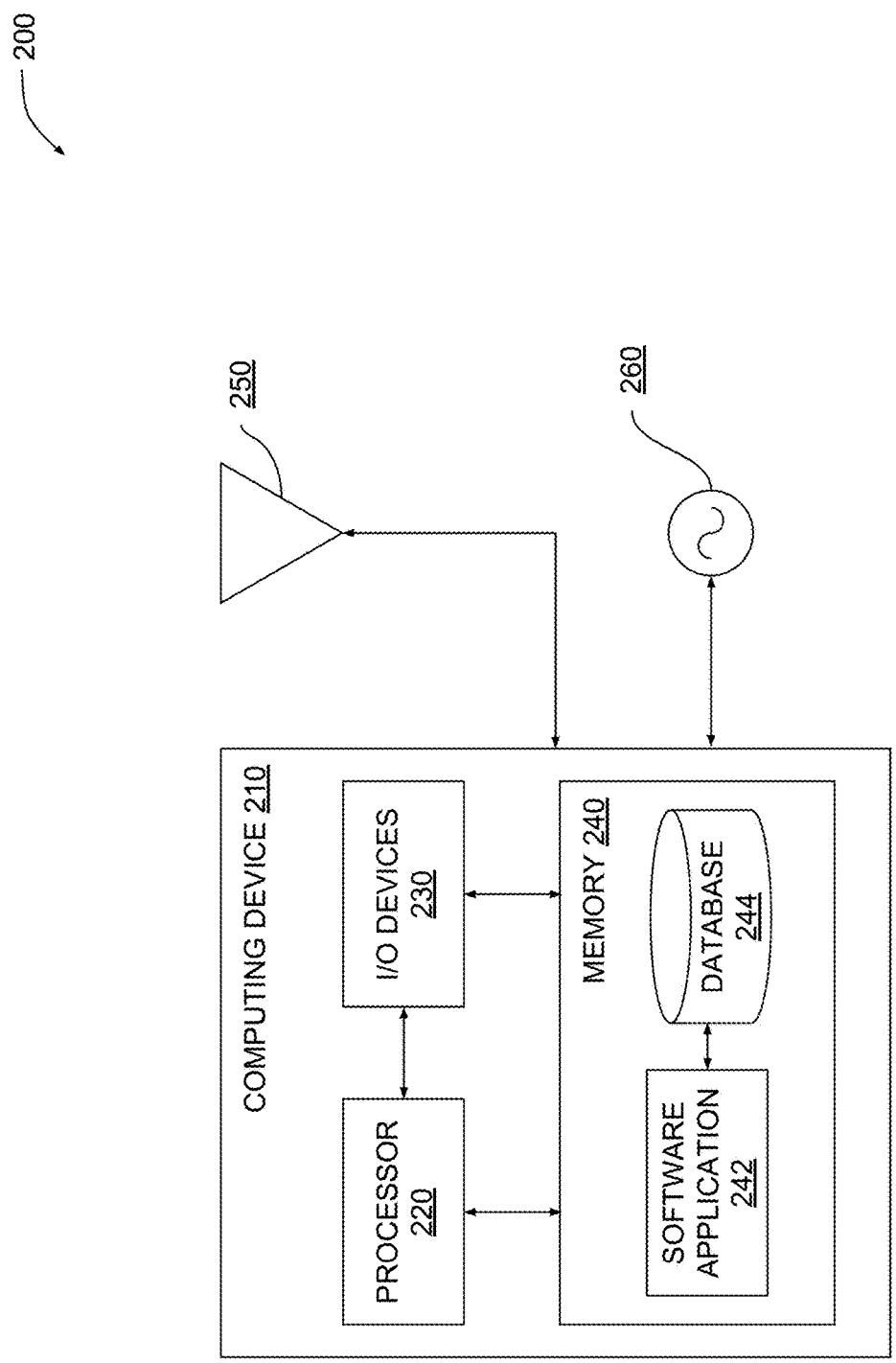
FIG. 2 illustrates a node configured to transmit and receive data within the network system of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 illustrates a node configured to transmit and receive data within the mesh network of FIG. 1, according to various embodiments. As shown, a node 200 includes a computing device 210 coupled to a transceiver 250 and an oscillator 260. Computing device 210 coordinates the operations of node 200. Transceiver 250 is configured to transmit and receive data packets across network system 100 using a range of channels and power levels. Oscillator 260 provides one or more oscillation signals according to which the transmission and reception of data packets can be scheduled. Node 200 may be used to implement any of border router nodes 112, MPD nodes 114, and BPD nodes 116 of FIG. 1.

Computing device 210 includes a processor 220, input/output (I/O) devices 230, and memory 240, coupled together. Processor 220 may include any hardware configured to process data and execute software applications. Processor 220 may include real-time clock (RTC) (not shown) according to which processor 220 maintains an estimate of the current time. I/O devices 230 include devices configured to receive input, devices configured to provide output, and devices configured to both receive input and provide output. Memory 240 may be implemented by any technically feasible storage medium.

Memory 240 includes a software application 242 and database 244, coupled together. Software application 242 includes program code that, when executed by processor 220, performs any of the node-oriented computing functionality described herein. Software application 242 may also interface with transceiver 250 to coordinate the transmission and reception of data packets across network system 100 based on timing signals generated by oscillator 260.

In operation, software application 242 implements the discovery process discussed above in conjunction with FIG. 1 in order to establish adjacency with one or more neighboring nodes. Software application 242 may generate a neighbor table that indicates node adjacency and various other neighbor data, and then store the neighbor table in database 244. Once the discovery process is complete, software application 242 causes node 200 to initiate normal operations. In the course of normal operations, software application 242 implements channel hopping across a repeating sequence of time slots. Software application 242 may cause node 200 to receive data periodically within these time slots with a periodicity that is referred to herein as the "listen rate" of node 200. Time slotting is discussed in greater detail below in conjunction with FIGS. 3A-3B.

Figure 3A:
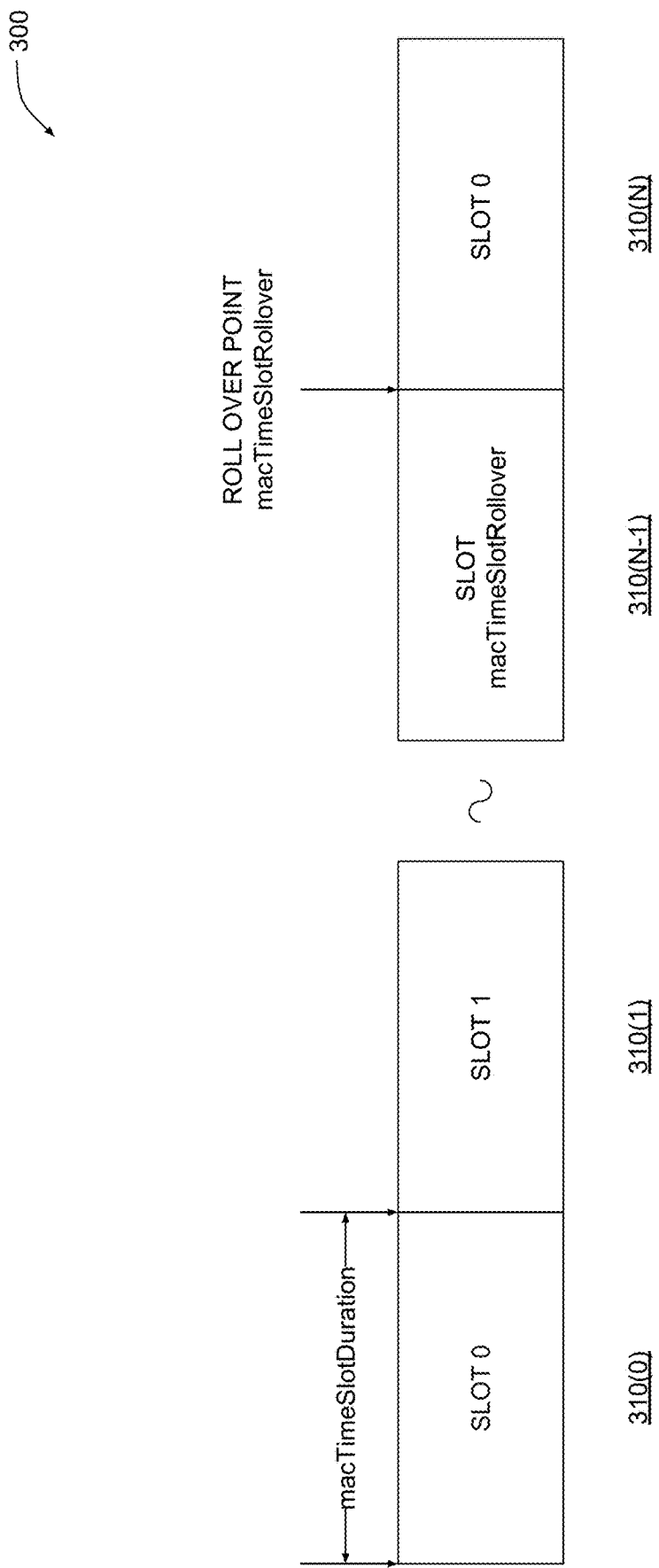
FIGS. 3A-3B illustrate sequences of time slots within which a node of FIG. 1 transmits and/or receives data, according to various embodiments.

FIG. 3A illustrates a sequence of time slots within which the node of FIG. 2 transmits and/or receives data, according to various embodiments. As shown, a sequence 300 of time slots includes N time slots 310(0) through 310(N), each having a duration of macTimeSlotDuration. A given time slot 310 is associated with a slot number falling within the range of zero to macTimeSlotRollover, where zero is the minimum slot number and macTimeSlotRollover is the maximum slot number. The current slot number increments sequentially over time until macTimeSlotRollover is reached, and then rolls over to zero.

During initialization, the node selects a random starting slot number within the range of available slot numbers and stores this slot number along with a timestamp. The node generates the timestamp based on the above-mentioned estimate of current time maintained by the RTC within processor 210. The node may also store a parts-per-million (PPM) correction factor than can be applied to the estimate of the current time.

Figure 3B:
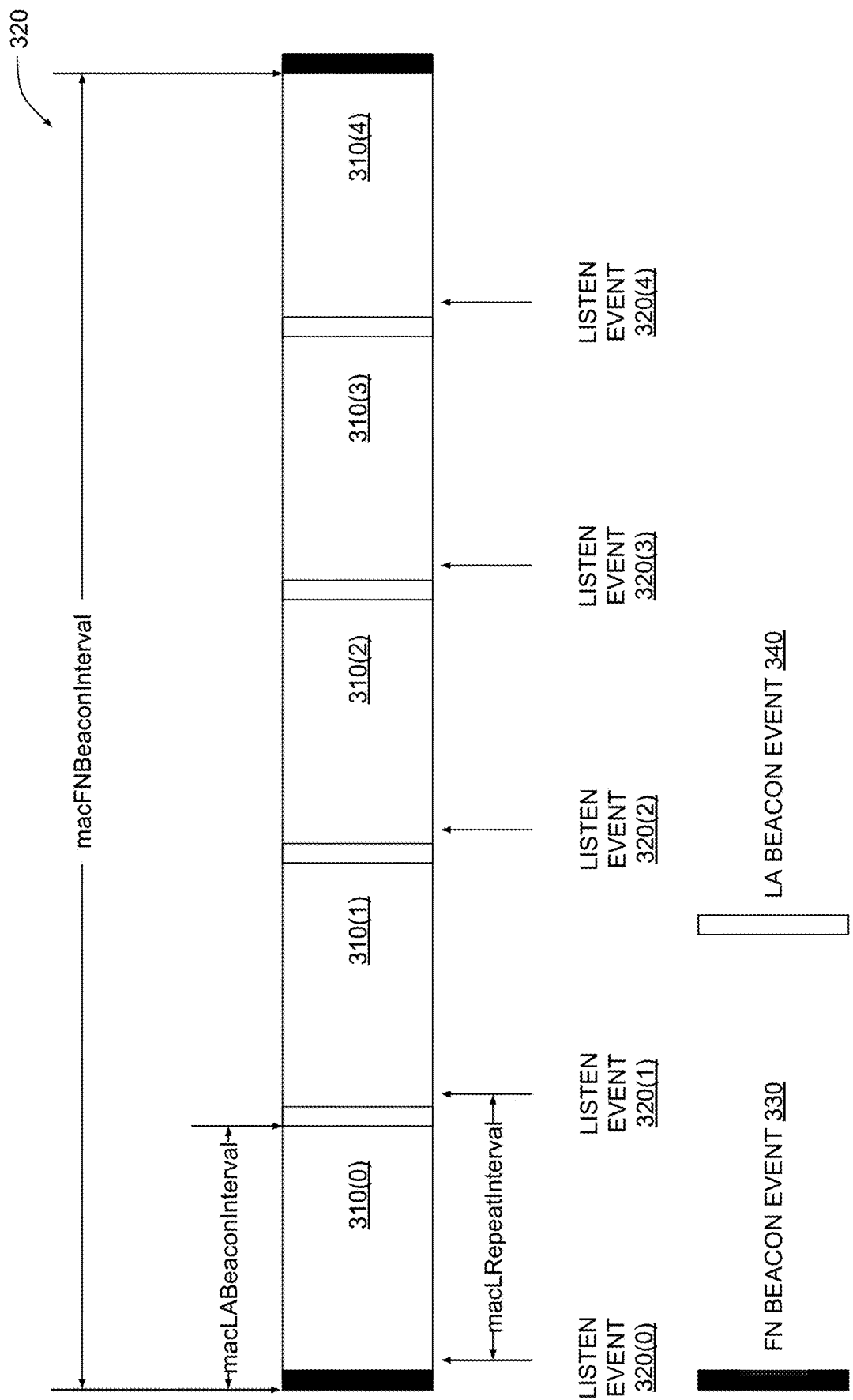

At any given time during operation, the node dynamically computes the current slot number as well as the time into the current slot using the estimate of current time and any of the other information discussed above. Based on the current slot number, the node determines a specific channel to associate with the time slot. In this manner, the node may determine a sequence of channels corresponding to a sequence of time slots. This sequence of channels is the above-referenced channel hopping sequence for the node. In embodiments where the node evaluates a Jenkins hash function to compute the current receive channel, as discussed above, the node evaluates this function using the current slot number. FIG. 3B illustrates an exemplary listening schedule associated with a node.

FIG. 3B illustrates a sequence of time slots within which the node of FIG. 2 transmits and/or receives data, according to various embodiments. As shown, sequence 300 of FIG. 3B is expanded to include time slots 310(0) through 310(4). Each time slot 310 includes a listen event 320 and either a field network (FN) beacon event 330 or a local area (LA) beacon event 340.

During listen events 320, the node may receive data. In particular, within a given time slot 310 and during the corresponding listen event 320, the node may receive data on the channel associated with that time slot. Listen events 320 repeat periodically with an interval of macLRepeatInterval. The duration of this interval defines the listen rate of the node. Listen events 320 have a configurable duration and a configurable offset within a respective time slot 310. During either type of beacon event, the node transmits a beacon. The node transmits FN beacons 330 periodically with an interval of macFNBeaconInterval and transmits LA beacons 340 periodically with an interval of macLABeaconInterval. The node implements listen events 320, FN beacon events 330, and LA beacon events 340 according to separate schedules that can be enabled or disabled independently of one another.

Referring generally to FIGS. 1-3B, the foregoing techniques permit the various types of nodes within network system 100 to communicate with one another. Persons skilled in the art will recognize that the disclosed techniques may be applicable to any type of network and any type of node beyond those explicitly discussed herein. Further, the techniques described herein are sufficiently flexible to be utilized within any technically feasible network environment or combination of network environments and with any available communication protocols.

Coordinating Parent-Child Node Communication

Figure 4:
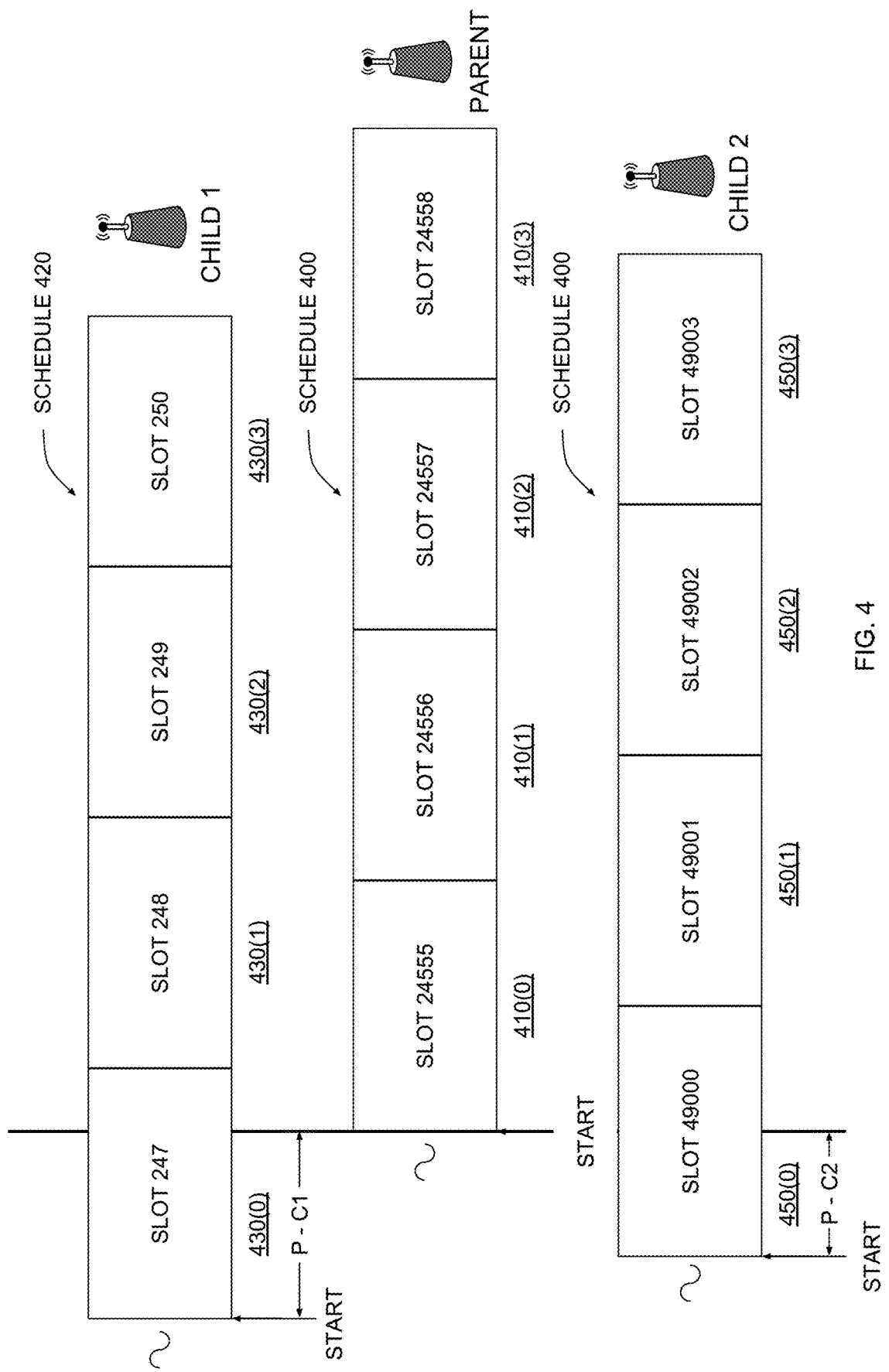
FIG. 4 illustrates various sequences of time slots that are offset relative to one another, according to various embodiments.

FIG. 4 illustrates various sequences of time slots that are offset relative to one another, according to various embodiments. As shown, a schedule 400 associated with a parent node includes time slots 410(0) through 410(3). A schedule 420 associated with a child node 1 includes time slots 430(0) through 430(3). A schedule 440 associated with a child node 2 includes time slots 450(0) through 450(3). The parent node is configured to communicate with child nodes 1 and 2 despite the various schedules shown lacking synchronization. The parent node and child nodes are configured to implement a specific technique in order to account for differences between slot number and slot timing between the various schedules. This technique is described in greater detail below with respect to the parent node and a given child node.

During discovery, the parent node and a given child node establish communications with one another via an exchange of data packets. During this exchange, the child node broadcasts multiple discovery beacon requests (DBRs). The parent node, upon receiving a DBR, responds with a discovery beacon (DB). The parent node transmits the DB to the child node during a response window indicated by the DBRs. The parent node then proceeds to send time sync beacons to the child node periodically during a passive link evaluation period. During the passive link evaluation period, the child node evaluates a signal strength associated with received time sync beacons. Each time sync beacon indicates the current slot number of the parent node and the start time of the current time slot, among other things.

The child node analyzes a given time sync beacon received from the parent node and then determines a delta between the current time slot number of the child node and the current time slot number of the parent node. For example, child 1 could analyze a received time beacon and then compute a delta of 24308 between the current time slot number of the child node, 247, and the current time slot number of the parent node, 24555. The child node also determines an offset between a start time of the current time slot of the child node and the start time of the current time slot of the parent node. For example, child 2 could compute this offset as P–C2, as is shown.

The child node reports back to the parent node the computed delta and offset, and the parent node stores this information. In one embodiment, the child node transmits the delta and offset within normal data packets in order to conserve network transmissions and reduce overhead. Subsequently, when the parent node transmits data packets to the child node, the parent node schedules transmissions based on the delta and offset associated with the child node. For example, the parent could compute the current slot number of child node 1, 247, based on the stored delta 24308 and the current slot number of the parent node, 24555. The parent node could then evaluate the Jenkins hash function with the computed slot number and MAC address of the child node to determine a current receive channel for the child node. The parent node could also determine timing associated with a listen event executed by the child node based on the stored offset of P–C1. Finally, using the current receive channel and listen event timing, the parent code could transmit a data packet to child node 1. Using a similar approach, the child node schedules transmissions to the parent node based on the delta and offset.

The parent node continues to transmit time sync beacons to the child node during normal operations. The parent node may transmit a given time sync beacon at a predefined time within a given time slot (e.g., the start of the time slot), or at a time specified in the time sync beacon. These time sync beacons further include an estimate of the current time and an uncertainty associated with that time estimate. Upon receipt of a time beacon, the child node adjusts an internal RTC and/or time slot schedule to correct any variation in the delta and offset. For example, child node 1 could determine that RTC clock drift has caused schedule 420 to shift in time relative to schedule 400. To preserve the delta and offset previously reported to the parent node, child node 1 would then truncate or extend a current time slot. This technique further causes the duration of time slots implemented by the child node to match the duration of time slots associated with the parent node. In one embodiment, the child node performs these adjustments initially upon receipt of a time sync beacon and prior to computing the delta and offset. In the manner described, child nodes need only report the delta and offset once, and then subsequently maintain a respective delta and offset based on received time sync beacons.

Figure 5A:
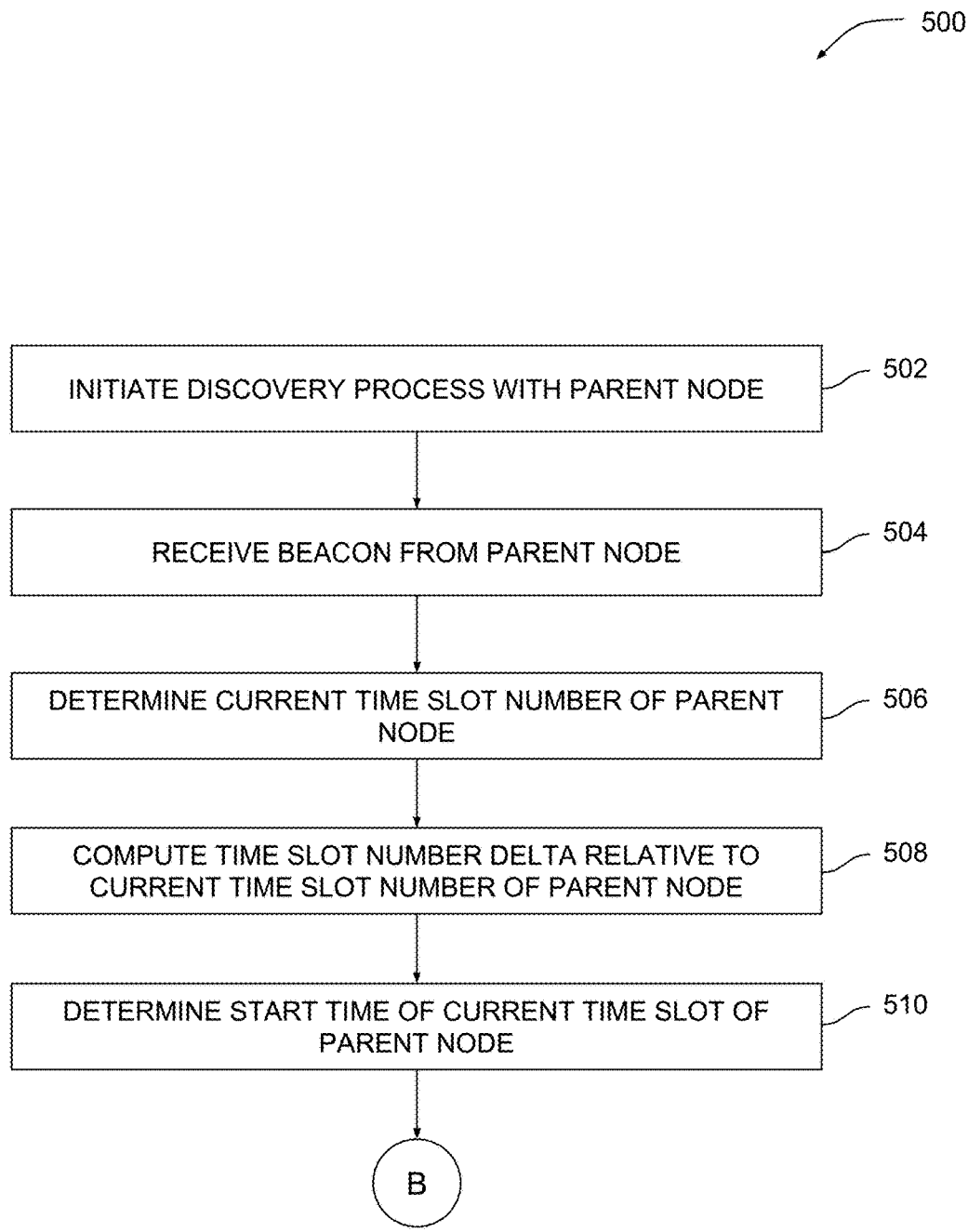
FIGS. 5A-5B set forth a flow diagram of method steps for establishing a communication link with a parent node, according to various embodiments.
Figure 5B:
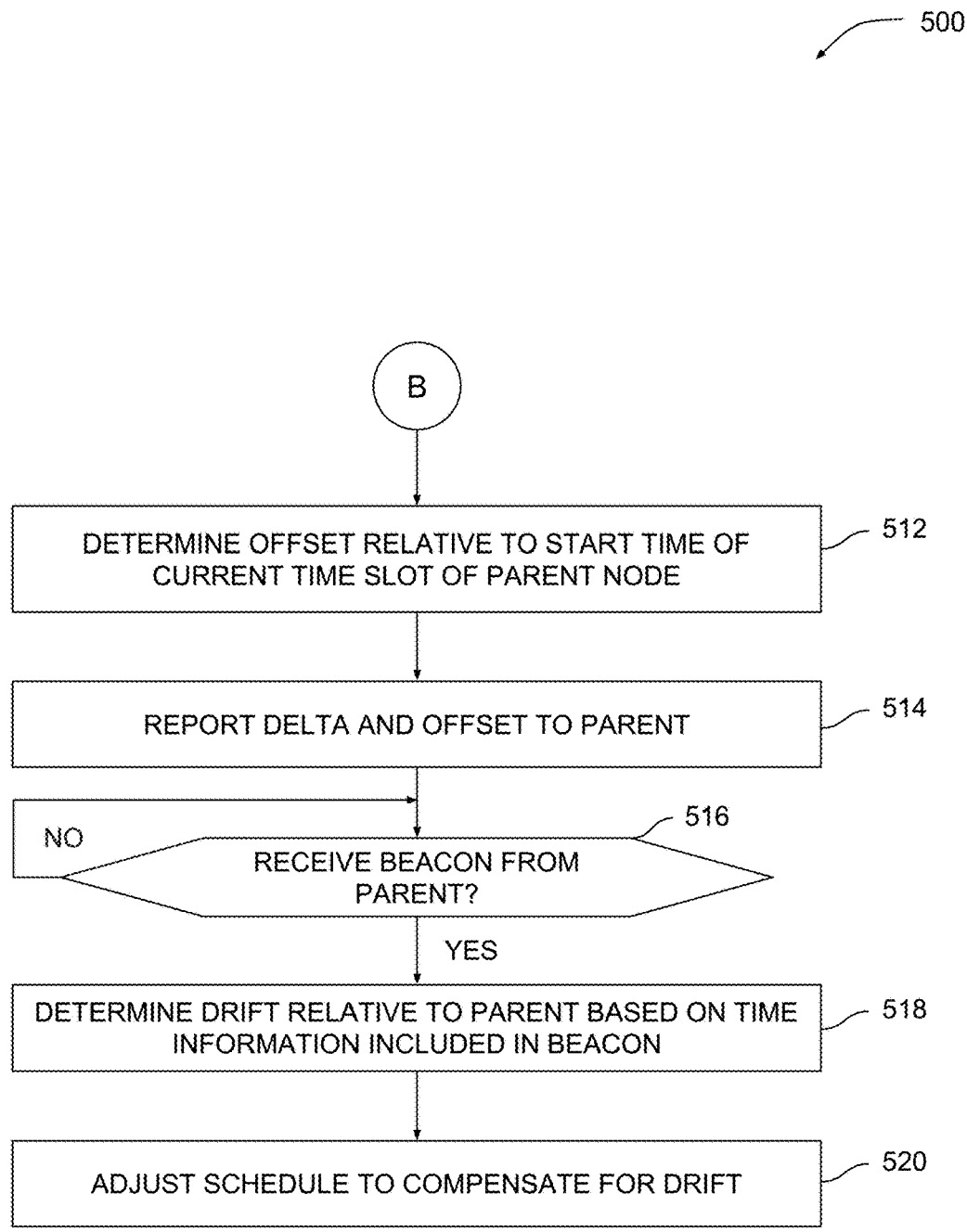

One advantage of this approach is that child nodes need only perform minor adjustments to time slot schedules in order to maintain communications with a parent node. Further, the parent node need only transmit time sync beacons to allow the child nodes to perform these minor adjustments. FIGS. 5A-5B describe this approach in stepwise fashion.

FIGS. 5A-5B set forth a flow diagram of method steps for establishing a communication link with a parent node, according to various embodiments. Although the method steps are described in conjunction with the systems of FIGS. 1-4, persons skilled in the art will understand that any system configured to perform the method steps in any order falls within the scope of the present invention.

As shown, a method 500 begins at step 502, where a child node initiates a discovery process with a potential parent node. Either or both of the child node and the potential parent node could be an MPD node 114 or a BPD node 116. The child node typically initiates the discovery process in order to gain network access. During initiation of the discovery process, the child node and the potential parent node establish communications, and the potential parent node becomes a parent of the child node. At step 504, the child node receives a time sync beacon from that parent node. The parent node transmits the time sync beacon during a receive window that is implemented by the child node. The time sync beacon includes various timing information associated with the parent node, including the current time slot number and the start time of the current time slot.

At step 506, the child node analyzes the time sync beacon to extract the current slot number of the parent node. The child node and the parent node may have widely varying time slot numbers depending on when those nodes first powered on, among other things. At step 508, the child node computes a time slot number delta ("delta") relative to the time slot number of the parent node. In doing so, the child node determines the difference between the current time slot number of the child node and the current time slot number of the parent node.

At step 510, the child node analyzes the time sync beacon to extract the start time of the current time slot of the parent node. The child node and the parent node may not have aligned time slot schedules because those nodes may have powered on at different times, among other possible reasons. At step 512, the child node computes a time slot start time offset ("offset") relative to the start time of the current time slot of the parent node. The child node performs this step by determining the difference between the start time of the current time slot of the child node and the start time of the current time slot of the parent node.

At step 514, the child node reports the delta computed at step 508 and the offset computed at step 512 to the parent node. The parent node is then capable of transmitting data packets to the child node based on the delta and offset. For example, the parent could compute the current slot number of the child node based on the offset. The parent node could then evaluate the Jenkins hash function with the computed slot number and MAC address of the child node to determine a current receive channel for the child node. The parent node could also determine timing associated with a listen event executed by the child node based on the offset. Finally, using the current receive channel and listen event timing, the parent code could transmit a data packet to the child node.

The method 500 proceeds to step 516. The child node repeats step 516 until another time sync beacon arrives, and then proceeds to step 518. In addition to the slot number and start time discussed above, time sync beacons also include various other time information associated with the parent node. That information may include an estimate of the current time and a PPM uncertainty of that estimate. At step 518, the child node determines a clock drift of an internal RTC clock based on the time information included in the time sync beacon. At step 520, the child node adjusts a time slot schedule to compensate for the drift. The child node could, for example, truncate a current time slot or extend a current time slot to match time slot duration with the parent node. In one embodiment, the child node performs steps 518 and 520 immediately following step 504 during an initialization process.

In sum, a wireless mesh network includes a child node coupled to a parent node. The parent node transmits time sync beacons that indicate a time slot number and a start time for a current time slot. The child node receives the time sync beacons and determines a delta between the current time slot number of the child node and the current time slot number of the parent node. The child node also computes an offset between a start time of the current slot of the child node and the start time of the current slot of the parent node. The child node reports the delta and the offset to the parent node. Based on the delta and the offset, the parent node determines when, and on what channel, the child node is predicted to be receiving transmissions, and then schedules transmissions to the child node accordingly.

Based on the delta and the offset, the parent node determines when, and on what channel, the child node is predicted to be receiving transmissions. The parent node then schedules transmissions to the child node accordingly. The child node also occasionally updates a real-time clock (RTC) based on the time sync beacons in order to maintain the same delta and offset reported to the parent node.

At least one advantage of these techniques is that the child node can remain paired with the parent node without synchronizing time slot schedules in a manner that would disrupt communications. In addition, the parent node need only transmit regular time beacons to the child nodes to allow the child nodes to maintain predictable timing relative to the parent node. Accordingly, these techniques represent a technological advantage over the prior art.

1. Some embodiments include a computer-implemented method for establishing a communication link between nodes, the method comprising receiving a first beacon at a child node, wherein the first beacon is transmitted by a parent node and indicates a first time slot number assigned to a first time slot associated with the parent node and a first start time corresponding to the first time slot, computing a first delta based on the first time slot number and a second time slot number assigned to a second time slot associated with the child node, computing a first offset based on the first start time and a second start time corresponding to the second time slot, and transmitting the first delta and the first offset to the parent node, wherein the parent node schedules subsequent transmissions to the child node based on the first delta and the first offset.

2. The computer-implemented method of clause 1, wherein the parent node implements a first sequence of time slots that includes the first time slot, the child node implements a second sequence of time slots that includes the second time slot, and the first sequence of time slots is not synchronized with the second sequence of time slots.

3. The computer-implemented method of any of clauses 1 and 2, further comprising broadcasting a discovery request beacon to the parent node to initiate a discovery process, wherein the parent node transmits the first beacon in response to the discovery request beacon.

4. The computer-implemented method of any of clauses 1, 2, and 3, further comprising performing one or more passive link evaluation operations to evaluate a signal strength associated with the first beacon.

5. The computer-implemented method of any of clauses 1, 2, 3, and 4, wherein the parent node schedules a first subsequent transmission to the child node by determining the second time slot number based on the first time slot number and the first delta, determining a first receive channel associated with the second time slot based on the second time slot number, determining the second start time based on the first start time and the first offset, determining a first listen event initiated by the child node based on the second start time, and scheduling the first subsequent transmission to occur on the first receive channel during the first listen event.

6. The computer-implemented method of any of clauses 1, 2, 3, 4, and 5, further comprising receiving a second beacon from the parent node, extracting from the second beacon first timing information associated with the parent node, and adjusting a first sequence of time slots that includes the first time slot based on the first timing information.

7. The computer-implemented method of any of clauses 1, 2, 3, 4, 5, and 6, wherein the first timing information includes a first estimate of the current time and an uncertainty value associated with the first estimate.

8. The computer-implemented method of any of clauses 1, 2, 3, 4, 5, 6, and 7, wherein adjusting the first sequence of time slots comprises truncating or extending the first time slot.

9. The computer-implemented method of any of clauses 1, 2, 3, 4, 5, 6, 7, and 8, wherein the child node receives the second beacon after receiving the first beacon.

10. The computer-implemented method of any of clauses 1, 2, 3, 4, 5, 6, 7, 8, and 9, wherein adjusting the first sequence of time slots corrects a variation in at least one of the first delta and the first offset.

11. Some embodiments include a non-transitory computer-readable medium storing program instructions that, when executed by a processor, cause the processor to establish a communication link between nodes by performing the steps of receiving a first beacon at a child node, wherein the first beacon is transmitted by a parent node and indicates a first time slot number assigned to a first time slot associated with the parent node and a first start time corresponding to the first time slot, computing a first delta based on the first time slot number and a second time slot number assigned to a second time slot associated with the child node, computing a first offset based on the first start time and a second start time corresponding to the second time slot, and transmitting the first delta and the first offset to the parent node, wherein the parent node schedules subsequent transmissions to the child node based on the first delta and the first offset.

12. The non-transitory computer-readable medium of clause 11, further comprising the steps of broadcasting a discovery request beacon to the parent node to initiate a discovery process, wherein the parent node transmits the first beacon in response to the discovery request beacon, and performing one or more passive link evaluation operations to evaluate a signal strength associated with the first beacon, wherein the child node pairs with the parent node based on at least one result of the one or more passive link evaluation operations.

13. The non-transitory computer-readable medium of any of clauses 11 and 12, further comprising the steps of receiving a second beacon from the parent node, extracting from the second beacon first timing information associated with the parent node, and adjusting a first sequence of time slots that includes the first time slot based on the first timing information.

14. The non-transitory computer-readable medium of any of clauses 11, 12, and 13, wherein the first timing information includes a first estimate of the current time and an uncertainty value associated with the first estimate, and wherein the step of adjusting the first sequence of time slots comprises truncating or extending the first time slot based on the first estimate.

15. The non-transitory computer-readable medium of any of clauses 11, 12, 13, and 14, further comprising adjusting a real-time clock included in the child node based on the first timing information.

16. Some embodiments include a system, comprising a parent node included in a wireless mesh network, a child node coupled to the parent node and configured to perform the steps of receiving a first beacon from the parent node, wherein the first beacon indicates a first time slot number assigned to a first time slot associated with the parent node and a first start time corresponding to the first time slot, computing a first delta based on the first time slot number and a second time slot number assigned to a second time slot associated with the child node, computing a first offset based on the first start time and a second start time corresponding to the second time slot, and transmitting the first delta and the first offset to the parent node, wherein the parent node schedules subsequent transmissions to the child node based on the first delta and the first offset.

17. The system of clause 16, wherein the parent node schedules a first subsequent transmission to the child node by determining the second time slot number based on the first time slot number and the first delta, determining a first receive channel associated with the second time slot based on the second time slot number, determining the second start time based on the first start time and the first offset, determining a first listen event initiated by the child node based on the second start time, and scheduling the first subsequent transmission to occur on the first receive channel during the first listen event.

18. The system of any of clauses 16 and 17, further comprising an additional child node coupled to the parent node and configured to perform the steps of receiving a second beacon from the parent node, wherein the second beacon indicates the first time slot number assigned to the first time slot and the first start time, computing a second delta based on the second time slot number and a third time slot number assigned to a third time slot associated with the additional child node, computing a second offset based on the first start time and a third start time corresponding to the third time slot, and transmitting the second delta and the second offset to the parent node, wherein the parent node schedules subsequent transmissions to the additional child node based on the second delta and the second offset.

19. The system of any of clauses 16, 17, and 18, wherein the additional node is further configured to perform the steps of receiving a third beacon from the parent node, extracting from the third beacon second timing information associated with the parent node, and adjusting a first sequence of time slots that includes the third time slot based on the second timing information.

20. The system of any of clauses 16, 17, 18, and 19, wherein the child node includes a memory storing a software application, and a processor that, when executing the software application, is configured to perform the steps of receiving the first beacon from the parent node, computing the first delta, computing the first offset, and transmitting the first delta and the first offset to the parent node.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for establishing a communication link between nodes, the method comprising:
   receiving a first beacon at a child node, wherein the first beacon is transmitted by a parent node and indicates a first time slot number assigned to a first time slot associated with the parent node and a first start time corresponding to the first time slot;
   computing a first delta based on the first time slot number and a second time slot number assigned to a second time slot associated with the child node;
   computing a first offset based on the first start time and a second start time corresponding to the second time slot; and
   transmitting the first delta and the first offset to the parent node, wherein the parent node schedules subsequent transmissions to the child node based on the first delta and the first offset.

2. The computer-implemented method of claim 1, wherein the parent node implements a first sequence of time slots that includes the first time slot, the child node implements a second sequence of time slots that includes the second time slot, and the first sequence of time slots is not synchronized with the second sequence of time slots.

3. The computer-implemented method of claim 1, further comprising broadcasting a discovery request beacon to the parent node to initiate a discovery process, wherein the parent node transmits the first beacon in response to the discovery request beacon.

4. The computer-implemented method of claim 1, further comprising performing one or more passive link evaluation operations to evaluate a signal strength associated with the first beacon.

5. The computer-implemented method of claim 1, wherein the parent node schedules a first subsequent transmission to the child node by:
   determining the second time slot number based on the first time slot number and the first delta;
   determining a first receive channel associated with the second time slot based on the second time slot number;
   determining the second start time based on the first start time and the first offset;
   determining a first listen event initiated by the child node based on the second start time; and
   scheduling the first subsequent transmission to occur on the first receive channel during the first listen event.

6. The computer-implemented method of claim 1, further comprising:
   receiving a second beacon from the parent node;
   extracting from the second beacon first timing information associated with the parent node; and
   adjusting a first sequence of time slots that includes the first time slot based on the first timing information.

7. The computer-implemented method of claim 6, wherein the first timing information includes a first estimate of the current time and an uncertainty value associated with the first estimate.

8. The computer-implemented method of claim 6, wherein adjusting the first sequence of time slots comprises truncating or extending the first time slot.

9. The computer-implemented method of claim 6, wherein the child node receives the second beacon after receiving the first beacon.

10. The computer-implemented method of claim 6, wherein adjusting the first sequence of time slots corrects a variation in at least one of the first delta and the first offset.

11. A non-transitory computer-readable medium storing program instructions that, when executed by a processor, cause the processor to establish a communication link between nodes by performing the steps of:
   receiving a first beacon at a child node, wherein the first beacon is transmitted by a parent node and indicates a first time slot number assigned to a first time slot associated with the parent node and a first start time corresponding to the first time slot;
   computing a first delta based on the first time slot number and a second time slot number assigned to a second time slot associated with the child node;
   computing a first offset based on the first start time and a second start time corresponding to the second time slot; and
   transmitting the first delta and the first offset to the parent node, wherein the parent node schedules subsequent transmissions to the child node based on the first delta and the first offset.

12. The non-transitory computer-readable medium of claim 11, further comprising the steps of:
   broadcasting a discovery request beacon to the parent node to initiate a discovery process, wherein the parent node transmits the first beacon in response to the discovery request beacon; and
   performing one or more passive link evaluation operations to evaluate a signal strength associated with the first beacon, wherein the child node pairs with the parent node based on at least one result of the one or more passive link evaluation operations.

13. The non-transitory computer-readable medium of claim 11, further comprising the steps of:
receiving a second beacon from the parent node;
extracting from the second beacon first timing information associated with the parent node; and
adjusting a first sequence of time slots that includes the first time slot based on the first timing information.

14. The non-transitory computer-readable medium of claim 13, wherein the first timing information includes a first estimate of the current time and an uncertainty value associated with the first estimate, and wherein the step of adjusting the first sequence of time slots comprises truncating or extending the first time slot based on the first estimate.

15. The non-transitory computer-readable medium of claim 13, further comprising adjusting a real-time clock included in the child node based on the first timing information.

16. A system, comprising:
a parent node included in a wireless mesh network;
a child node coupled to the parent node and configured to perform the steps of:
receiving a first beacon from the parent node, wherein the first beacon indicates a first time slot number assigned to a first time slot associated with the parent node and a first start time corresponding to the first time slot,
computing a first delta based on the first time slot number and a second time slot number assigned to a second time slot associated with the child node,
computing a first offset based on the first start time and a second start time corresponding to the second time slot, and
transmitting the first delta and the first offset to the parent node, wherein the parent node schedules subsequent transmissions to the child node based on the first delta and the first offset.

17. The system of claim 16, wherein the parent node schedules a first subsequent transmission to the child node by:
determining the second time slot number based on the first time slot number and the first delta;
determining a first receive channel associated with the second time slot based on the second time slot number;
determining the second start time based on the first start time and the first offset;
determining a first listen event initiated by the child node based on the second start time; and
scheduling the first subsequent transmission to occur on the first receive channel during the first listen event.

18. The system of claim 16, further comprising:
an additional child node coupled to the parent node and configured to perform the steps of:
receiving a second beacon from the parent node, wherein the second beacon indicates the first time slot number assigned to the first time slot and the first start time,
computing a second delta based on the second time slot number and a third time slot number assigned to a third time slot associated with the additional child node,
computing a second offset based on the first start time and a third start time corresponding to the third time slot, and
transmitting the second delta and the second offset to the parent node, wherein the parent node schedules subsequent transmissions to the additional child node based on the second delta and the second offset.

19. The system of claim 18, wherein the additional node is further configured to perform the steps of:
receiving a third beacon from the parent node;
extracting from the third beacon second timing information associated with the parent node; and
adjusting a first sequence of time slots that includes the third time slot based on the second timing information.

20. The system of claim 16, wherein the child node includes:
a memory storing a software application; and
a processor that, when executing the software application, is configured to perform the steps of:
receiving the first beacon from the parent node,
computing the first delta,
computing the first offset, and
transmitting the first delta and the first offset to the parent node.

* * * * *